United States Patent [19]

Rowland

[11] Patent Number: 5,222,701
[45] Date of Patent: Jun. 29, 1993

[54] WALL MOUNTED SUPPORT FOR HOLDING ARTICLES

[76] Inventor: David E. Rowland, 4321 Vista Dr., Chula Vista, Calif. 91910-3131

[21] Appl. No.: 637,213

[22] Filed: Jan. 3, 1991

Related U.S. Application Data

[63] Continuation-in-part of Ser. No. 363,609, Jun. 6, 1989, Pat. No. Des. 323,972, and a continuation-in-part of Ser. No. 375,664, Jul. 8, 1989, abandoned, and a continuation-in-part of Ser. No. 575,867, Aug. 31, 1990, Pat. No. 5,062,184, said Ser. No. 375,664, continuation of Ser. No. 176,670, Apr. 1, 1988, now abandoned.

[51] Int. Cl.⁵ .................................................. B65D 63/00
[52] U.S. Cl. .................................. 248/74.3; 248/222.1; 248/316.1
[58] Field of Search ............... 248/231, 316.1, 74.3, 248/73, 69, 222.1, 224.3, 62, 314, 558, 225.1; 24/573.1–573.7, 116 A, 130

[56] References Cited

U.S. PATENT DOCUMENTS

| | | | |
|---|---|---|---|
| 670,870 | 3/1901 | Drozeski | 248/62 X |
| 2,724,881 | 11/1955 | Di Maria | 24/116 A |
| 3,069,538 | 12/1962 | Hobson | 248/231 |
| 3,197,830 | 8/1965 | Hoadley | |
| 3,421,187 | 1/1969 | Ryder | |
| 3,463,436 | 8/1969 | Foster | 248/231 |
| 3,746,294 | 7/1973 | Johnston | 248/231 |
| 3,888,440 | 6/1975 | Rebentisch | 248/222.1 |
| 3,894,707 | 7/1975 | Heard | 248/231 |
| 4,391,376 | 7/1983 | Finnegan | 248/73 X |
| 4,638,966 | 1/1987 | Ford | 248/62 |
| 4,768,741 | 9/1988 | Logsdon | 248/231 |
| 5,062,184 | 11/1991 | Rowland | 248/74.3 X |

FOREIGN PATENT DOCUMENTS

2191634 2/1974 France.
2328125 5/1977 France.

*Primary Examiner*—Karen J. Chotkowski

[57] ABSTRACT

This invention provides a support that may be used to hold articles and which may be removably attached to a base that is mounted on a wall. The device has two main parts (1) a base that may be mounted on a wall and (2) a plug-in device that may be inserted into or removed from the base. The base defines a cavity for receiving one end of the plug-in device. One wall of the cavity is a resilient arm the free end of which enters an indent in the plug-in device to provide some impedance to the removal of the plug-in device from the cavity. A cam or wedge may be used to firmly secure the arm in the indent and thus secure the plug-in device in the cavity. The plug-in device has two free ends each with a socket. A resilient cord, with spaced enlargements, extends between the free ends of the plug-in device and holds an article, such as a coil of wire or a broom handle, against the plug-in device.

25 Claims, 8 Drawing Sheets

WALL MOUNTED SUPPORT FOR HOLDING ARTICLES

RELATED APPLICATIONS

This application is a continuation-in-part of each of the following prior copending applications: Ser. No. 07/363,609, filed Jun. 6, 1989 and now U.S. Pat. No. 0,323,972, entitled Holder for Flexible Elements such as wire, cord, and rubber hose; Ser. No. 07/375,664, filed Jul. 8, 1989 and now abandoned, entitled Flexible Element Holder; and Serial No. 07/575,867, filed Aug. 31, 1990 and now U.S. Pat. No. 5,062,184, entitled Clip for Holding Elongated Devices. The aforesaid application Ser. No. 07/375,664 is a continuation-in-part of the earlier application Ser. No. 07/176,670 filed Apr. 1, 1988 and now abandoned, entitled Flexible Element Holder, now abandoned.

BACKGROUND OF THE INVENTION

Devices for holding a coil of wire, rubber hose, or the like are well known. Examples of such devices include Jonsson U.S. Pat. No. 4,752,054, United Kingdom patent 1,056,740, published Jan. 25, 1967, and West German patent 2,012,300, dated 23 Sep. 1971. Mounting devices that may be attached to a wall or other support, for holding wire, pipe or the like are also known, see U.S. Pat. No. 4,579,310, to Wells dated Apr. 1, 1986 and United Kingdom patent application to Williamson et al., No. 2,049,019, published 17 Dec. 1980.

SUMMARY OF THE INVENTION

This invention basically comprises two elements, as follows: a base that may be mounted on a wall or other support, and a plug-in device that plugs into the base and carries an article. The base has means to enable it to be mounted on a wall or other support. The base also has an inner wall that defines a cavity for receiving one end of the plug-in device. The lower part of the cavity is a shelf on which rests an end of the plug-in device. The wall also includes a resilient plastic arm that is integral with the remainder of the plastic base. This arm is long enough and thin enough, to give the arm resilience. The free end of the arm includes a projection with a sharp edge that enters an indent in the plug-in device to hold it in place. A wedge may be inserted to secure the projection in the indent and thereby firmly lock the plug-in device into the base. Instead of the wedge, a movable member may be employed to function as a cam and force the projection under pressure into the indent when the movable member is in one position. In another position of the movable member the only pressure pressing the projection into the indent is the resilience of the arm. In that case the plug-in device may be moved in and out of the cavity with a mild tendency for the arm to hold the projection in the indent.

The plug-in device may take several forms. In one form, the plug-in device has a Y-shape. The leg of the Y is the part that is positioned in the cavity of the base. A resilient flexible elongated cord with spaced enlargements extends from one arm of the Y to the other such arm. The article, which is held by the plug-in device, for example the handle of a broom or hammer, is positioned in the space between the arms of the Y and held in place by the resilient cord.

Another form of plug-in device is an elongated supporting means having an elongated resilient flexible cord, with spaced enlargements, extending from one end of the elongated supporting means to the other end. The article, to be held, such as a coil of wire, is held in the space between the resilient cord and the elongated supporting means. The elongated supporting means has one or more sockets at each of its ends for receiving the enlargements of the cord. In order for the cord to enter the sockets there are slits in the end walls of the elongated supporting means.

One end of the elongated supporting means rests on a shelf of the base and the shelf directly receives the downward force when the elongated cord is pulled and stretched in a downward direction as may be done during the wrapping of the cord around the article to be held by the elongated supporting means.

DETAILED DESCRIPTION OF THE DRAWINGS

Figure 1:
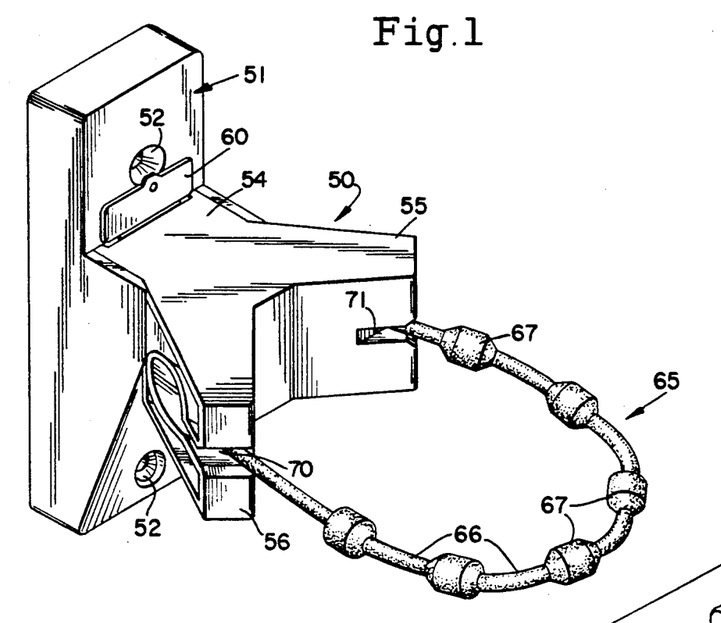
FIG. 1 is a perspective view of one form of the invention.

The apparatus of FIG. 1 may be mounted on a wall and will hold a tool with a handle such as a broom.

Figure 2:
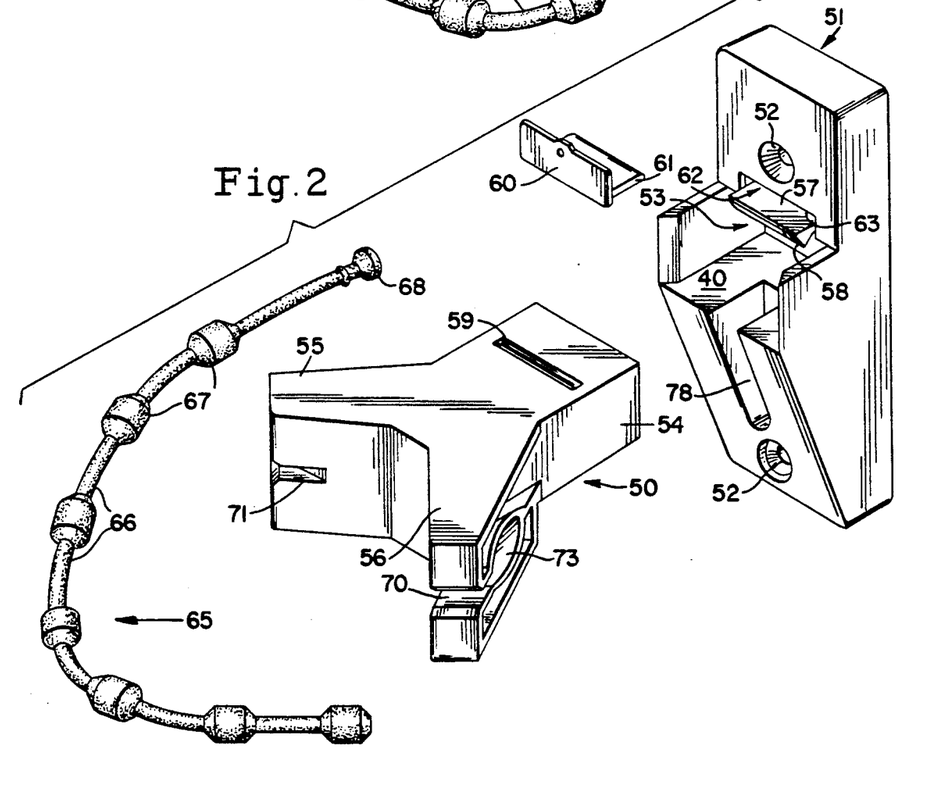
FIG. 2 is an exploded view of the form of the invention shown in FIG. 1.
Figure 3:
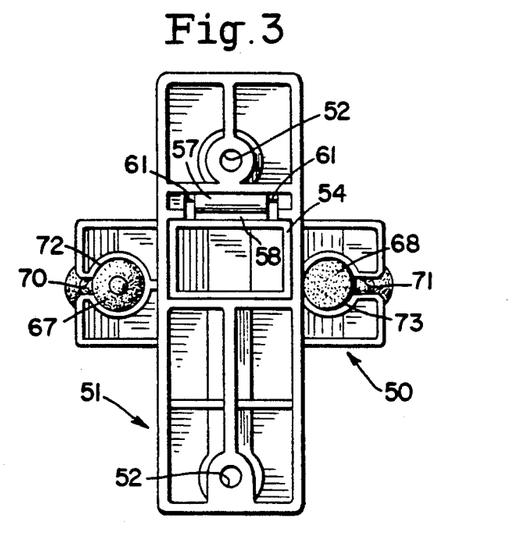
FIG. 3 is a rear view of the device of FIG. 4.
Figure 4:
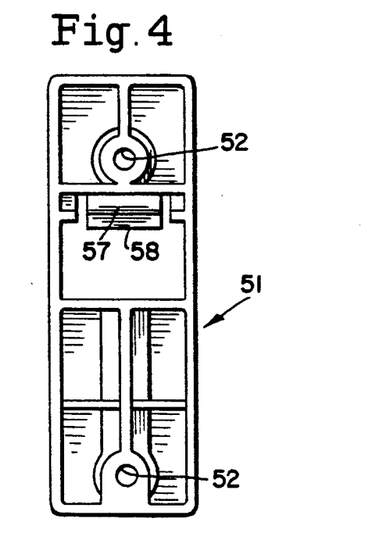
FIG. 4 is a rear view of the device of FIG. 1 but with the plug-in element 50 omitted.
Figure 5:
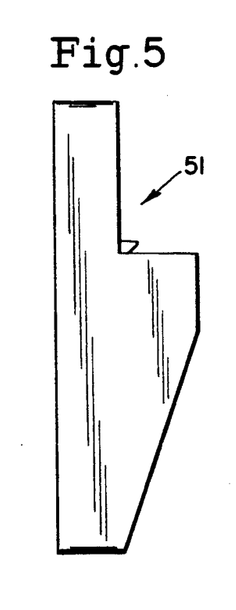
FIG. 5 is a side view of the device of FIG. 1 but with the plug-in element 50 omitted.
Figure 6:
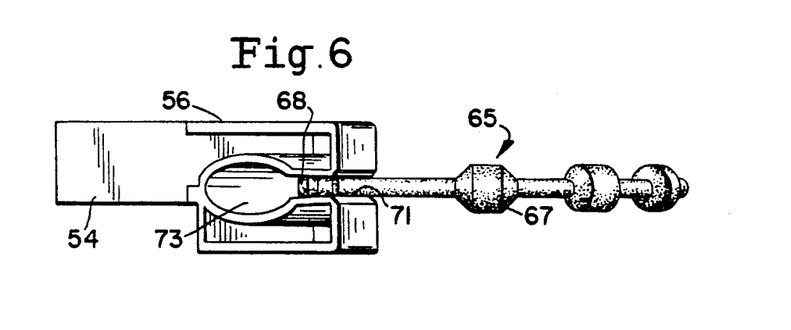
FIG. 6 is a side view of the insert 50 of FIG. 1 with the beaded cord in the socket.
Figure 7:
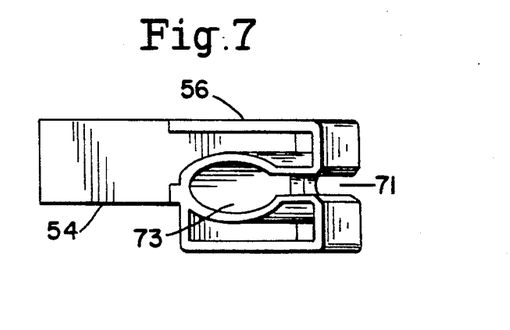
FIG. 7 is a side view of the insert 50, without the beaded cord of FIG. 1.
Figure 8:
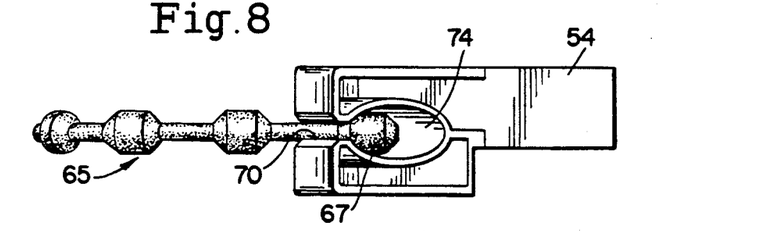
FIG. 8 is a side view of the other side of the insert 50 of FIG. 1 with the beaded cord in the socket.
Figure 9:
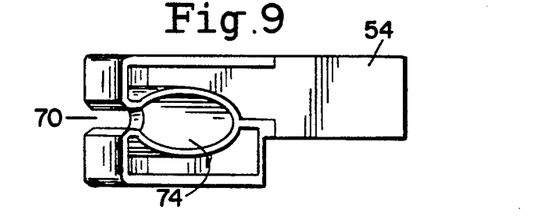
FIG. 9 is a side view of said other side of insert 50 but without the beaded cord therein.
Figure 10:
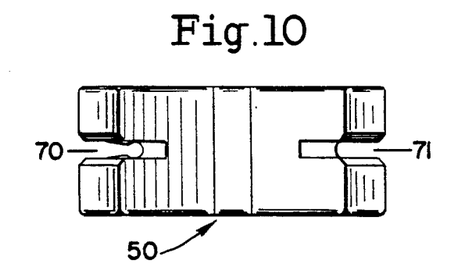
FIG. 10 is a front view of the insert 50 of FIG. 1 without the beaded cord.
Figure 11:
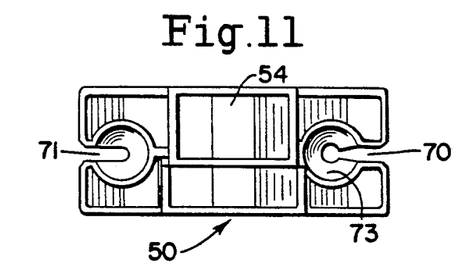
FIG. 11 is a rear view of the insert 50 of FIG. 1.
Figure 12:
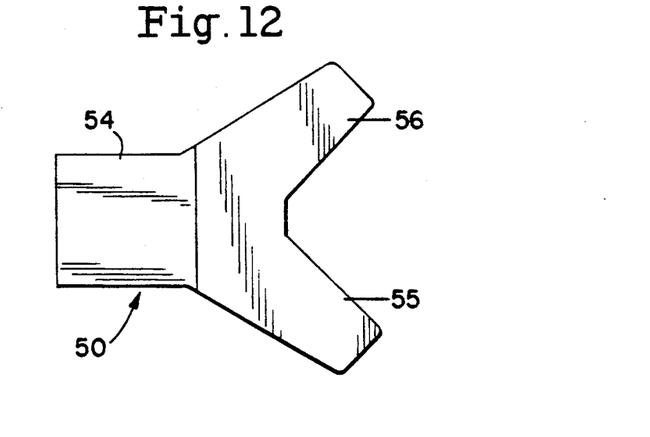
FIG. 12 is a bottom view of the insert 50 of FIG. 1.

The base 51 may be mounted on a wall, post or other upright member by screws through holes 52. The base 51 defines an opening 53 for receiving the support end 54 of the plug-in supporting device 50. The plug-in device 50 is of a generally Y-shape having two arms 55 and 56. When the plug-in device 50 is inserted in opening 53 the locking device 57 has a V-shaped projection 58 that engages indent 59 in the plug-in device 50. The locking device includes a strip of plastic, integral with the remainder of base 51, is sufficiently long and thin to have resilience, so that when the end 54 of plug-in device 50 is inserted in opening 53 the projection 58 is raised slightly until it snaps into indent 59. Once the projection 58 is in indent 59, it may be locked in place by inserting wedge 61, which has handle 60, in the space 62 between the upper surface of locking device 57 and the wall 63 of base 51. As long as the wedge 61 is in the space 62, the plug-in device 50 is securely held in the base 51. The plug-in device 50 may, however, be quickly removed from the base 51 by removing the wedge 61 and then pulling the plug-in device 50 out of base 51.

The handle of a tool is held between the arms 55 and 56 of the Y-shaped plug-in device by the beaded cord 65. The beaded cord 65 comprises a cord 66 with a plurality of spaced beads 67 and an enlargement 68 at one end.

The flexible elastic elongated member 65 including enlargement 68 and beads 67 is made as follows: The starting material is Estane TM, a thermoplastic polyurethane produced by B. F. Goodrich Co. This material is fed into the injection mold at 430° F. This temperature is in contrast to the temperature usually employed for injection molding which is 230° to 285° F. The typical diameter of elongated member 65 may be 0.125 inches with the bead diameter 0.375 inches. This is smaller than is customary for injection molding of this type. The material is then subjected to vacuum draw to pull the material into the cavities of the mold. This is to say: the mold is an elongated one and is as long as the elongated member. The Estane material is fed in one end of the mold, and a vacuum is applied to the other end of the mold to make sure that the material fills the entire mold. After the material is molded it is post cured in a heated oven for 24 hours at 140° F. The resulting product has excellent memory characteristics, —that is after being stretched it returns to its original shape.

To hold a tool in the plug-in device 50, the enlargement 68 is inserted through one of the slots 70 or 71 into one of the sockets 73 or 74. The beaded cord 65 is then pulled and stretched around the handle of the tool. The handle was placed vertically into the opening between the arms 55 and 56 of the Y-shaped plug-in device 50. When the resilient beaded cord is around the handle of the tool, one of the beads 67 is inserted through the other one of the slots 70 or 71 and into the open socket 73 or 74 as the case may be. The beaded cord 65 then holds the handle firmly against the plug-in device 50.

The tool may be removed from the base 51 in either of two ways. One way is to remove the beaded cord from one of the sockets 73 or 74. The other way is to remove wedge 61 and leave the plug-in device 50 on the tool while the tool plus device 50 is removed from base 51. This second way allows the tool to be quickly plugged into or removed from base 51.

Figure 13:
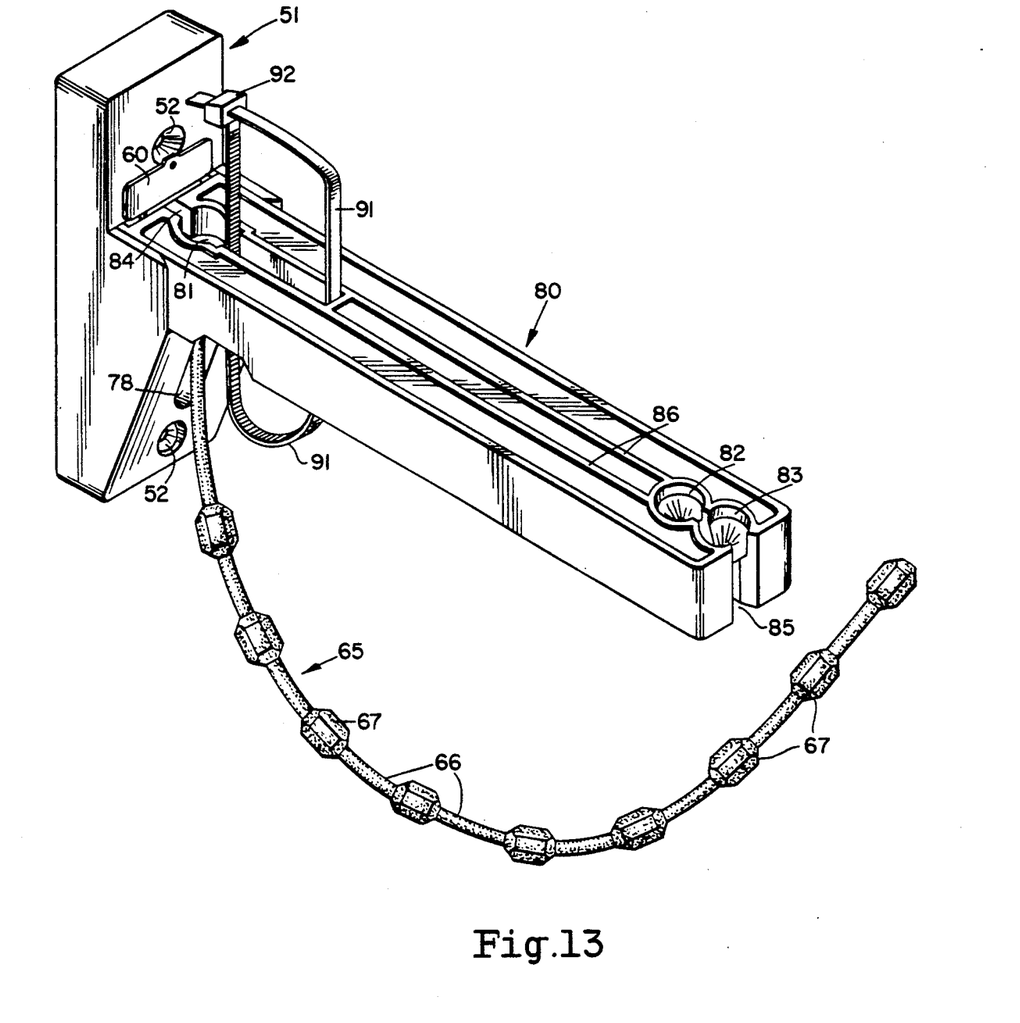
FIG. 13 is a perspective view of another form of the invention.

In FIG. 13, the base 51 is identical with the base 51 of FIG. 1, and elements 52, 53, 57, 58, 60, 61, 62, 63 and 78 of FIGS. 13 to 19 are identical with parts of FIGS. 1 to 12 that bear the same reference numbers. The main difference between the devices of FIGS. 1 and 13 is the device supported by the base 51. The projection 58 enters indent 59a to lock the device.

In FIGS. 13 to 19, the elongated support means 80 has three sockets 81, 82 and 83 for holding the beaded cord 65, 67, 68. The beaded cord of FIGS. 1 to 12 and the one of FIGS. 13 to 19 are identical with each other and are both made by the method described above.

The cord 66 of beaded cord 65 is inserted via slit 84 into socket 81 and then enlargement 68 is lowered into its socket 81; this being done while the elongated support means is not located in base 51. A portion of the beaded cord 66 near its free end is inserted in either one of sockets 82 or 83 via the slit 85. One of the beads 67 is then lowered into socket 82 or socket 83 as the case may be. The slits 84 and 85 are wider than the cord 66 but narrower than the size of either bead 67 or enlargement 68. The space between beads 67 may be greater than the vertical thickness of elongated support means 80. The base 51 has slot 78 for allowing the beaded cord 65 to pass downward from socket 81.

Figure 14:
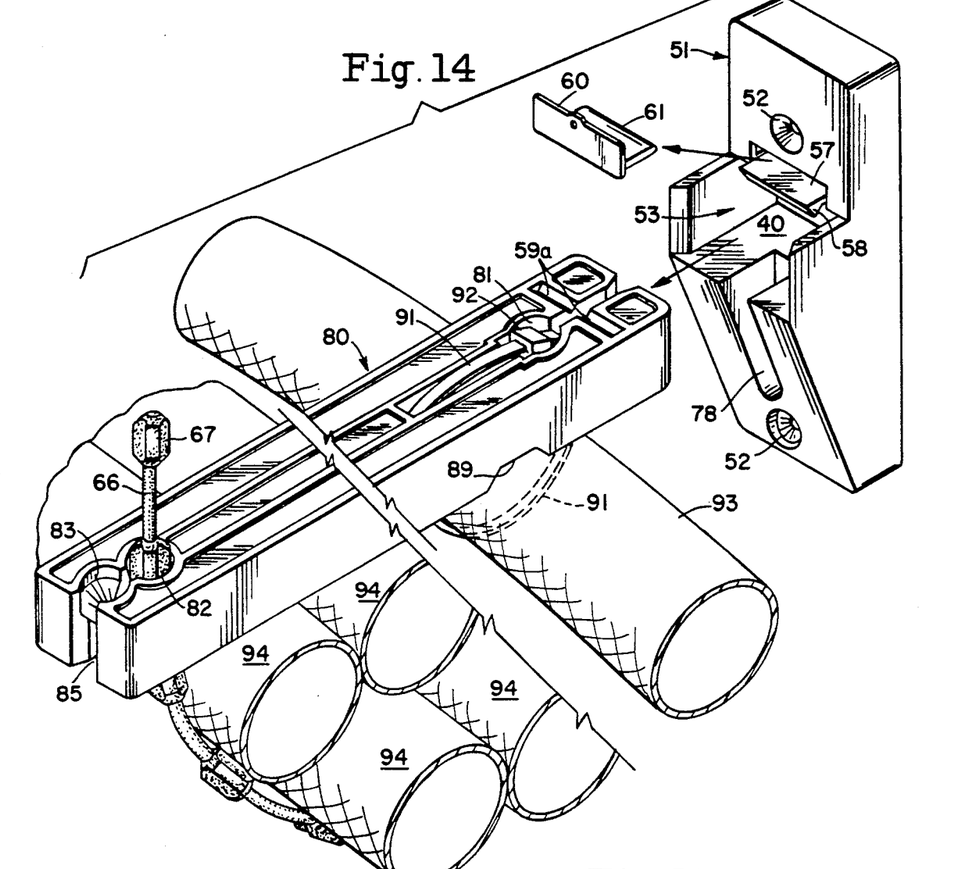
FIG. 14 is an exploded view of the device of FIG. 13 with the strap and the beaded cords holding elongated flexible elements.
Figure 15:
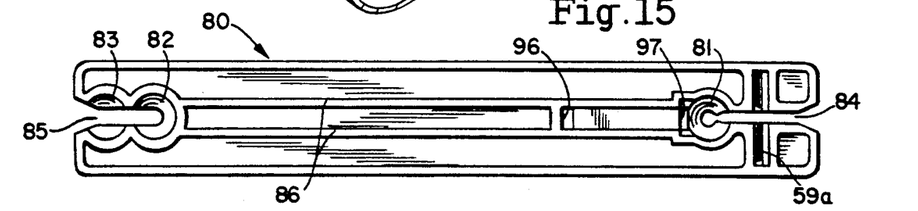
FIG. 15 is a top view of the elongated support member of FIG. 13.
Figure 16:
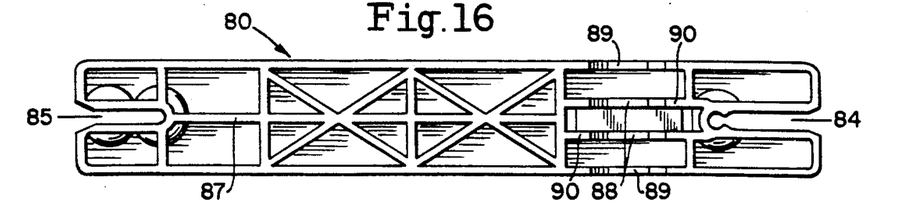
FIG. 16 is a bottom view of the elongated support member of FIG. 13.
Figures 17, 18, 19:
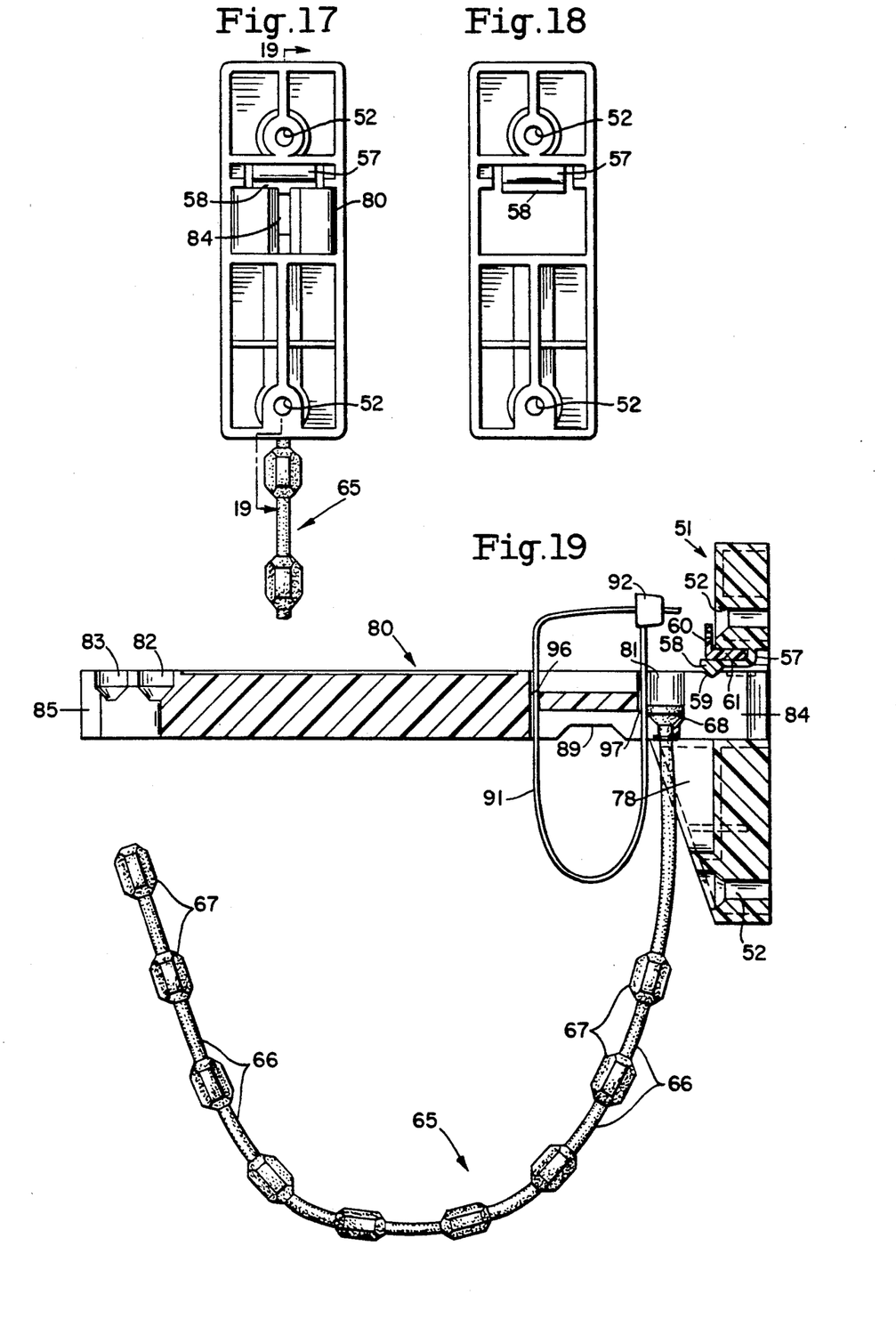
FIG. 17 is a rear view of the device of FIG. 13.
FIG. 18 is a rear view of the device of FIG. 13 with the elongated supporting member omitted.
FIG. 19 is a cross-sectional view taken along the line 19—19 of FIG. 17.

A plastic strap 91 passes through vertical slots 96, 97 (FIG. 15) so that this strap may hold a wire or hose 93 against the indent 89 in the elongated support means 80, as shown in FIG. 14.

The elongated support means 80 is molded from plastic in one piece and includes ribs 86, 87, 88 that interconnect the sockets 81, 82, 83 and give the elongated support means 80 great strength. Thus, stresses imposed by the beaded cord 65 in the three sockets 81, 82, 83 are assumed by the system of structural ribs shown in FIGS. 15 and 16.

The apparatus of FIG. 13 may be used to hold a bundle of wire or a coil of any elongated flexible element such as a garden hose 94. If there is a wire or hose that is to remain in place more or less permanently it is normally held by strap 91. For example, the hose 93 of FIG. 14 is held by strap 91 locked by lock 92. The strap 91 firmly clamps the hose 94 against the indented portion 89 of the elongated support means 80. The locking device 92, when locked, is located in socket 81 above enlargement 68.

The hose 94 is wound into a coil and is clamped against the bottom face of the elongated support means 80. If it is desired to uncoil the hose 94, the bead 67 is removed from its socket 82 or 83 as the case may be.

To clamp the hose or wire with the beaded cord 65, the enlargement 68 is inserted in its socket 81 if it is not already there. The resilient beaded cord 65 is then stretched and one of beads 67 inserted into one of the sockets 82 or 83 as previously described.

The apparatus of FIGS. 20 to 30 is similar to that of FIGS. 13 to 19, except for the two main differences (1) the locking device and (2) there is only one socket at the free end of the elongated supporting means 90. The elements 58a, 59b, 78, 84, 85, 89, 91, 92, 96, 97, 152 and 153 of FIGS. 20-30 perform the same functions, respectively, as the parts 58, 59, 78, 84, 85, 89, 91, 92, 96, 97, 52 and 53 of FIGS. 1 to 12.

Figures 23, 24, 25, 26, 27, 28, 29, 30:
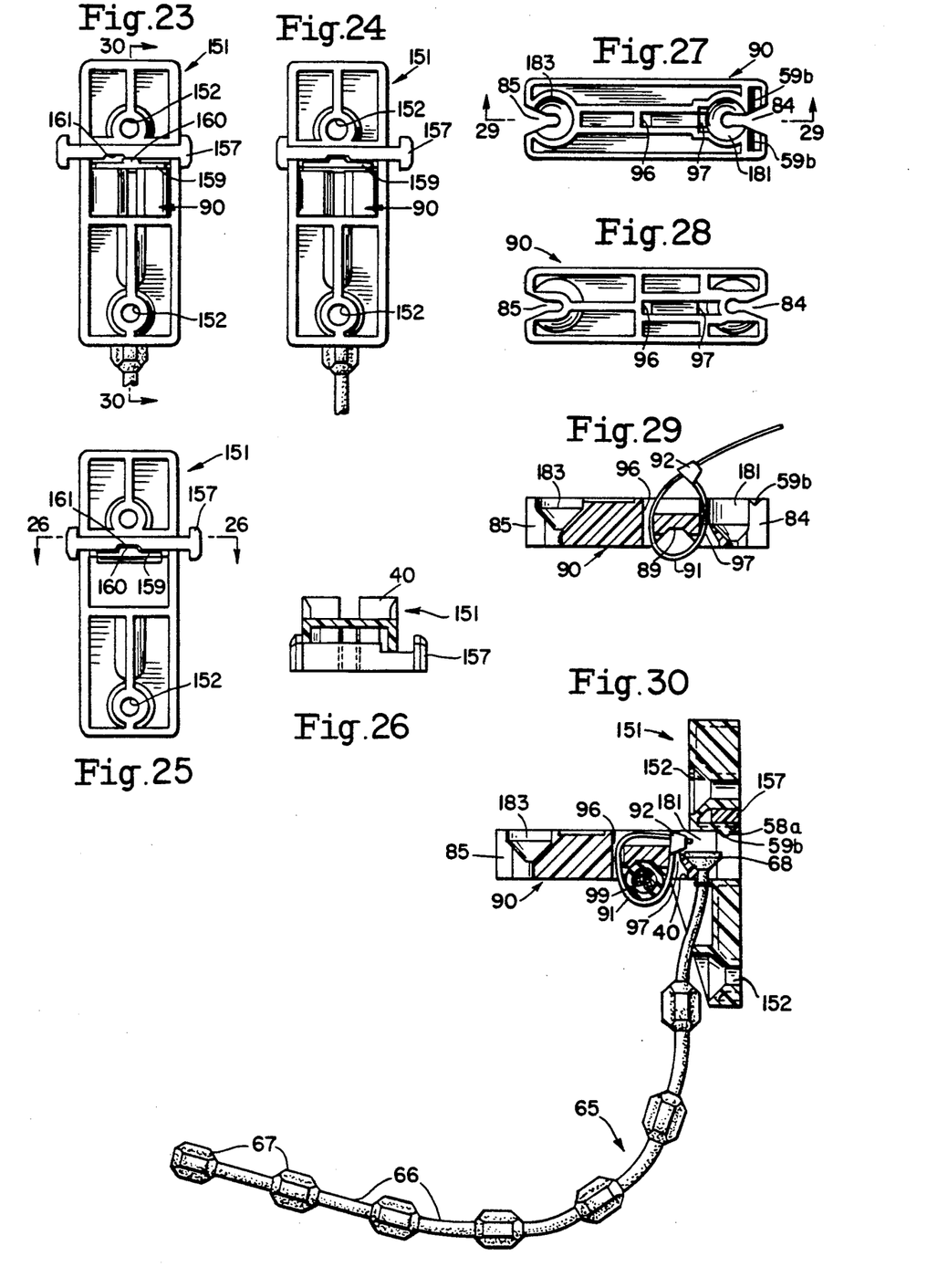
FIG. 23 is a rear view of the device of FIG. 20 with the lock in locked position.
FIG. 24 is a rear view of the device of FIG. 20 with the lock in unlocked position.
FIG. 25 is a rear view of the devices of FIG. 20 but with the elongated support member 90 omitted.
FIG. 26 is a cross-sectional view taken along line 26—26 of FIG. 25.
FIG. 27 is a top view of the elongated support means 90 of FIG. 20.
FIG. 28 is a bottom view of the elongated support means of FIG. 20.
FIG. 29 is a cross-sectional view of the elongated support means 90 of FIG. 1.
FIG. 30 is a cross-sectional view of the device of FIG. 20.

The locking device will now be explained with particular reference to FIGS. 23 to 25. When the locking handle 157 is in the position shown in FIG. 24, that is with raised element 160 in indent 169 of handle 157 the elongated support means 90 is relatively free to be moved out of the base 151. When, however, the handle 157 is moved to the left, as shown in FIG. 23, the handle 157 presses downwardly on projection 159 forcing it into indent 59b. This locks the elongated supporting means 90 in the base 151. The projection 159 is an integral part of base 151, but is connected to the rest of the base by a relatively thin portion to thus give the projection resilience in a vertical direction.

As a result, the elongated supporting means 90 of FIGS. 20 to 30 may be plugged into and pulled out of base 151 at will so long as the locking means is unlocked. The strap 91 may clamp a piece of wire 99 against the indented portion 89 of the supporting means 90 and the strap 91 may be locked by locking member 92. A bundle of wire, preferably in the form of a coil 100, may be held against the underside of the elongated supporting means 90 by pulling the beaded cord (which is anchored in socket 81 by enlargement 68) to stretch it and place it under tension when a bead 67 enters socket 83. To enable a bead 67 to reach the socket 83, the cord 66 enters through slit 85.

Figure 20:
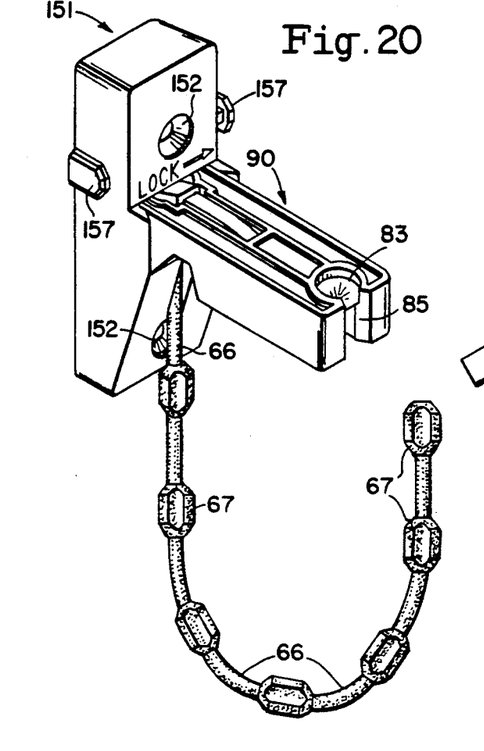
FIG. 20 is a perspective view of another form of the invention.
Figure 21:
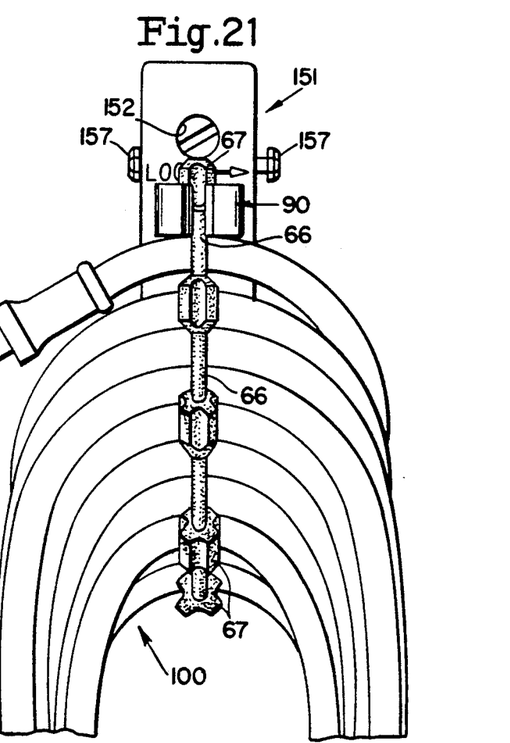
FIG. 21 is a front view of the device of FIG. 20 while the device is holding a bundle of wire.
Figure 22:
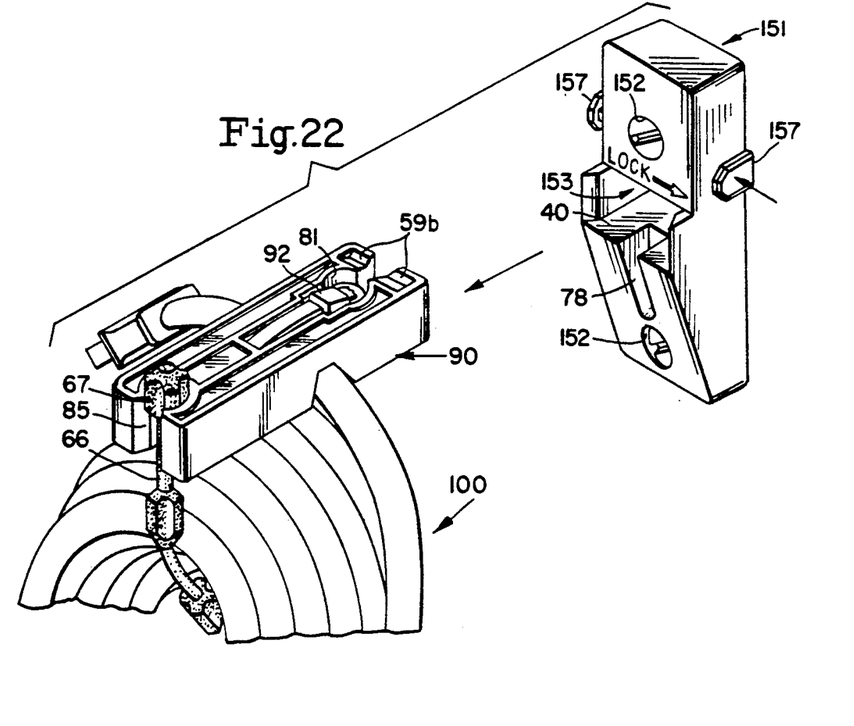
FIG. 22 is an exploded view of the device of FIG. 20.

Each form of the invention has a plug-in device—in FIG. 1 it is the Y-shaped device 50, and in FIGS. 13 and 20 it is the elongated supporting means 80 and 90 respectively.

In each form of the invention, the plug-in device 50, 80 or 90, as the case may be, rests on shelf 40 of the base 51. This provides strength to the overall device. For example, in connection with FIGS. 13 and 20, the resilient flexible beaded cord 65 is pulled and stretched downwardly before it is wrapped around a bundle of wire or a coil of hose. This downward pressure occurs just above the shelf 40 of base 51. Thus, the largest force normally applied to the overall device occurs just above the shelf 40. With the form of the invention shown in FIG. 1, the side walls 41 of the cavity 53 resist the torque applied by rear end 54 of the plug-in device 50, during the pulling and stretching of the beaded cord 65.

I claim to have invented:

1. A device for holding an article, comprising:
   an elongated flexible member that is stretchable and has a plurality of spaced-apart enlargements along the same, said elongated member having two ends,
   connecting means to which each of said ends is connected at spaced-apart places on said connecting means, with at least one of such connections being a removable connection,
   said connecting means having a body with first, second and third surfaces and defining a socket extending inwardly into said body from said first surface for receiving and holding any one of a plurality of said enlargements with any such one enlargement at least partially within the body of said connecting means,
   said body defining a hole, extending from said socket to said second surface, through which said elongated flexible member may pass,
   said body defining a slit extending from said third surface to said socket and hole so that said elongated flexible member may be inserted through said slit and so that any one of a plurality of said enlargements may be inserted in said socket with said elongated flexible member extending through said hole,
   said connecting means and said elongated flexible member comprising means for holding an article, and
   elongated tying means that has a loop extending away from said connecting means for clamping a portion of the article against said connecting means, said tying means being positioned between said places.

2. A device as defined in claim 1 in which said body defines a second socket adjacent said first-named socket, said second socket extending from said first surface into the body for receiving any one of a plurality of said enlargements with at least a part of such one enlargement extending below said first surface, said body also defining a hole extending from said second socket to said second surface so that one of a plurality of said enlargements may be seated in said second socket with a portion of said elongated flexible member extending through said second hole,
   said body also defining a slit interconnecting said sockets to allow said elongated flexible member to be inserted into said second socket and said second hole.

3. A device as defined in claim 1 in which said first and second surfaces are parallel to each other and perpendicular to said third surface.

4. A device for holding an article, comprising:
   a base having means for mounting the same on a support,
   a plug-in device including holding means for holding an article,
   said base defining a cavity and said plug-in device having one end that will fit into and mate with said cavity,
   said base including a resilient arm that is integral with said base, said arm having a free end, said base having a portion in spaced relation with said resilient arm,
   said plug-in device having an indent for receiving said free end when said plug-in device is in said base and is mating with said cavity, and
   movable means operable to be moved between said resilient arm and said portion of said base for holding said free end in said indent to thereby secure said plug-in device in said base.

5. A device as defined in claim 4 in which said holding means comprises a flexible element for holding said article.

6. A device as defined in claim 5 in which said flexible element is resilient and stretchable.

7. A device as defined in claim 6 in which said flexible element is elongated and has enlargements spaced along it.

8. A device as defined in claim 7 in which said plug-in device has means for receiving said elongated flexible element with one of said enlargements holding the elongated flexible element in fixed relation to said plug-in device.

9. A device as defined in claim 4, in which said movable means is a wedge having a handle, said wedge being insertable between said resilient arm and said portion of said base.

10. A device as defined in claim 4, said resilient arm having a raised element, said plug-in device entering said cavity in a given direction, said movable means being mounted for movement on said base in a direction transverse to said given direction between at least two positions, said movable means in one of said positions pressing against said raised element to hold said free end in said indent to thereby secure said plug-in device in said base and said movable means in another of said positions allowing movement of said free end out of said indent to thereby allow said plug-in device to be removed from said base.

11. A device as defined in claim 10 in which said base has a rear side, said movable means extending along said rear side of said base.

12. A device as defined in claim 4, in which said base has a wall defining said cavity, said wall including a shelf on which said plug-in device rests, said shelf having a cavity in it, said holding means having a resilient cord extending from said plug-in device through said cavity for holding said article.

13. A device as defined in claim 4 in which said plug-in device has said one end for entering said cavity and two arms extending away from said cavity when said one end of said plug-in device is in said cavity, said holding means extending from one to the other of said two arms for holding an article.

14. A device as defined in claim 4, comprising:

said plug-in device comprising an elongated supporting means one end of which may be inserted in and secured in said cavity, said elongated supporting means extending away from said base and having two ends, said holding means extending from adjacent one end, to adjacent the other end, of said elongated supporting means, for holding an article.

15. A device for holding an article, comprising:

a base having an inner wall that defines a cavity, an elongated supporting means having one end that may be inserted in said cavity and mating therewith, said elongated supporting means having two ends, an elongated flexible member means extending from adjacent said one end of said elongated supporting means to adjacent the other end thereof, with a space between said elongated supporting means and said elongated flexible member means, for holding an article in said space, and a shelf extending away from said base for at least partially supporting said elongated supporting member.

16. A device as defined in claim 15, said shelf having an opening in it through which said elongated flexible member means passes.

17. A device as defined in claim 16 including means connecting said elongated flexible member means to said one end above said opening in said shelf.

18. A device as defined in claim 15, in which said elongated flexible member means is a cord with spaced enlargements thereon, secured to said elongated supporting means adjacent to said one end thereof, said elongated supporting means including a free end remote from said base and also defining socket means at said free end for connecting said elongated flexible member means to said free end.

19. A device as defined in claim 18 in which said free end defines a slit through which the beaded cord, between its enlargements may enter.

20. A device as defined in claim 19, in which said elongated supporting means defines a socket adjacent to said free end, said slit extending from said free end to said socket so that the portion of said cord between enlargements may enter said slit and one of said enlargements may rest in said socket.

21. A device for holding an article comprising:

an elongated flexible member having spaced-apart enlargements along the same, a body having two locations thereon which are spaced from each other, said body defining, at one of said locations, a socket that mates with at least one of said enlargements, means for attaching said member to said body at the other of said locations, means located on said body member between said locations for holding at least a portion of said article against said body, and elongate tying means that has a loop extending away from said body for clamping a portion of the article against said body, said tying means being positioned between said locations.

22. A device as defined in claim 21, comprising:

said means for attaching including a socket one of said sockets comprising means for receiving one of said enlargements and the other one of said sockets comprising means for receiving one of a plurality of said enlargements.

23. A device for holding an article, comprising:

an elongated flexible member that has a plurality of spaced-apart enlargements along the same, connecting means to which spaced-apart portions of said member are connected, with at least one of such connections being a removable connection, said connecting means having a body with first and second ends, said connecting means having an elongated slit, extending through the body, into which a portion of the elongated member that is between enlargements may pass, said enlargements being too large to pass through said slit, said slit extending to an outer surface of said body so that the elongated member may pass through the slit to any of a plurality of positions along the length of said body, and tying cord means that has a loop extending away from said body for clamping a portion of the article against said body, said tying cord being positioned between said connections.

24. A device as defined in claim 23 comprising holding means along said slit for tending to hold said elongated member in either of at least two positions along said slit.

25. A device as defined in claim 24 in which said holding means comprises first and second sockets along said slit, said sockets being shaped to mate with said enlargements.

* * * * *

UNITED STATES PATENT AND TRADEMARK OFFICE
CERTIFICATE OF CORRECTION

PATENT NO. : 5,222,701
DATED : June 29, 1993
INVENTOR(S) : David E. Rowland

It is certified that error appears in the above-identified patent and that said Letters Patent is hereby corrected as shown below:

Claim 21 (line 12), col. 8, line 25, change "and" to: -- comprising: --

Claim 22 (line 2) col. 8, line 31, insert a comma after the word "socket".

Signed and Sealed this

Twenty-fifth Day of April, 1995

Attest:

BRUCE LEHMAN

Attesting Officer     Commissioner of Patents and Trademarks